(12) United States Patent
Mooney et al.

(10) Patent No.: US 8,231,473 B2
(45) Date of Patent: Jul. 31, 2012

(54) DISTRIBUTION OF BENEFITS IN A MULTIUSER GAME

(75) Inventors: William Henry Kelly Mooney, San Francisco, CA (US); Matthew Adam Ocko, Palo Alto, CA (US); Carl Eric Schiermeyer, Burlingame, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,905

(22) Filed: Sep. 26, 2011

(65) Prior Publication Data

US 2012/0015745 A1 Jan. 19, 2012

Related U.S. Application Data

(63) Continuation of application No. 12/855,536, filed on Aug. 12, 2010.

(60) Provisional application No. 61/233,751, filed on Aug. 13, 2009.

(51) Int. Cl.
*G06F 17/00* (2006.01)
(52) U.S. Cl. ....................................................... 463/42
(58) Field of Classification Search ................. 463/7, 25, 463/32, 37, 42; 705/1
See application file for complete search history.

(56) References Cited

U.S. PATENT DOCUMENTS

| | | | | |
|---|---|---|---|---|
| 8,047,915 B2* | 11/2011 | Lyle et al. | ........................ | 463/31 |
| 2006/0178975 A1* | 8/2006 | Jung et al. | ........................ | 705/35 |
| 2009/0104956 A1* | 4/2009 | Kay et al. | ........................ | 463/7 |
| 2010/0229108 A1* | 9/2010 | Gerson et al. | ................. | 715/757 |
| 2011/0300923 A1* | 12/2011 | Van Luchene | .................. | 463/25 |
| 2012/0015744 A1 | 1/2012 | Mooney et al. | | |
| 2012/0015746 A1 | 1/2012 | Mooney et al. | | |

OTHER PUBLICATIONS

"U.S. Appl. No. 12/855,536, Ex Parte Quayle Action mailed Jan. 31, 2012", 6 pgs.
"U.S. Appl. No. 13/244,902, Non Final Office Action mailed Dec. 19, 2011", 6 pgs.
"U.S. Appl. No. 13/244,911, Non Final Office Action mailed Jan. 13, 2012", 7 pgs.

* cited by examiner

*Primary Examiner* — Ronald Laneau
(74) *Attorney, Agent, or Firm* — Schwegman, Lundberg & Woessner P.A.

(57) ABSTRACT

Systems and methods to distribute benefits and detriments in a multiuser game are described. In some embodiments, a method accesses social network information associated with a player of a game. The player controls a first player character in the game where the first player character has certain attributes. The method accesses profile information associated with a friend of the player, who controls a second player character. A proxy based on the second player is created and includes multiple proxy attributes based on the profile information associated with the friend of the player. A game event outcome associated with the first player character is determined based on the first player character attributes and at least one proxy attribute. The game event outcome includes an in-game benefit or detriment that is distributed to the first and second player characters based on the proxy.

20 Claims, 11 Drawing Sheets

Proxy Attributes Page

225 — Name: Proxy 5₁ 230
Source: Friend 5₁ 130
Owner: Player 105
Orientation: Player 105's Team 1215
Specialty: Thief
Education: Hard Knox U.

205 — ☑ Associated
210 — [5] Position/Rank

Created: June 1, 2009
Last Seen: August 2, 2009
Last Updated: July 4, 2009
Health: 100
Armor: 32

Assets — 215

Weapons:
  Bat
  Revolver
Tools:
  Crow Bar
Cash:
  $1502.00
Powers:
  Gambling
Favors/Gifts:
  Gold Watch
  Car Service 220 — Recent Activity Mission 1 with you 10 days ago Mission 2 with you and Guild 3 20 days ago Task 33 with you 40 days ago Fight Mona C in level 4 42 days ago Obtained mastery in lock picking 45 days ago (Proxy 5₁) 230

DISTRIBUTION OF BENEFITS IN A MULTIUSER GAME

CLAIM OF PRIORITY

This application is a continuation of and claims the benefit of priority under 35 U.S.C. §120 to U.S. patent application Ser. No. 12/855,536, filed on Aug. 12, 2010, which claims the benefit of priority under 35 U.S.C. §119(e) to U.S. Provisional Patent Application Ser. No. 61/233,751, filed on Aug. 13, 2009, the benefit of priority of each of which is claimed hereby, and each of which are incorporated by reference herein in its entirety.

TECHNICAL FIELD

The present disclosure relates to games and applications in general and in particular to computer-implemented online games, such as online role-playing games, playable by more than one person from more than one location.

BACKGROUND

In many games, there is a virtual world or some other imagined playing space where a player of the game controls one or more player characters (herein "characters," "player characters," or "PCs"). Player characters can be considered in-game representations of the controlling player. As used here, the terms player, user, entity, and friend may refer to the in game player character controlled by that player, user, entity, or friend, unless context suggests otherwise. A game display can display a representation of the player character. A game engine accepts inputs from the player, determines player character actions, decides outcomes of events, and presents the player with a game display illuminating what happened.

In some games, there are multiple players, wherein each player controls one or more player characters. In such games, when multiple persons are playing together, there may be game events and operations that can only be done, or are more successful, when multiple players are engaged in the task or operation.

In addition to characters actively managed by players (i.e., PCs), the game engine might also manage non-player characters ("NPCs"). A non-player character gets its movements, actions, decisions, etc. from the game engine, as opposed to getting them from inputs of a player.

An electronic social networking system typically operates with a social networking server or servers providing interaction between users such that a user can specify other users of the social networking system as "friends." Alternatively, some social networking systems programmatically select certain users to be "friends" (e.g., those in the same geographic area). As should be apparent, a collection of users and the "friend" connections between users can form a social graph that can be traversed to find second, third and more remote connections between users, much like a graph of nodes connected by edges can be traversed.

BRIEF DESCRIPTION OF THE DRAWINGS

FIG. 2 depicts an example Proxy Attributes Page.

DESCRIPTION OF EXAMPLE EMBODIMENTS

Figure 1:
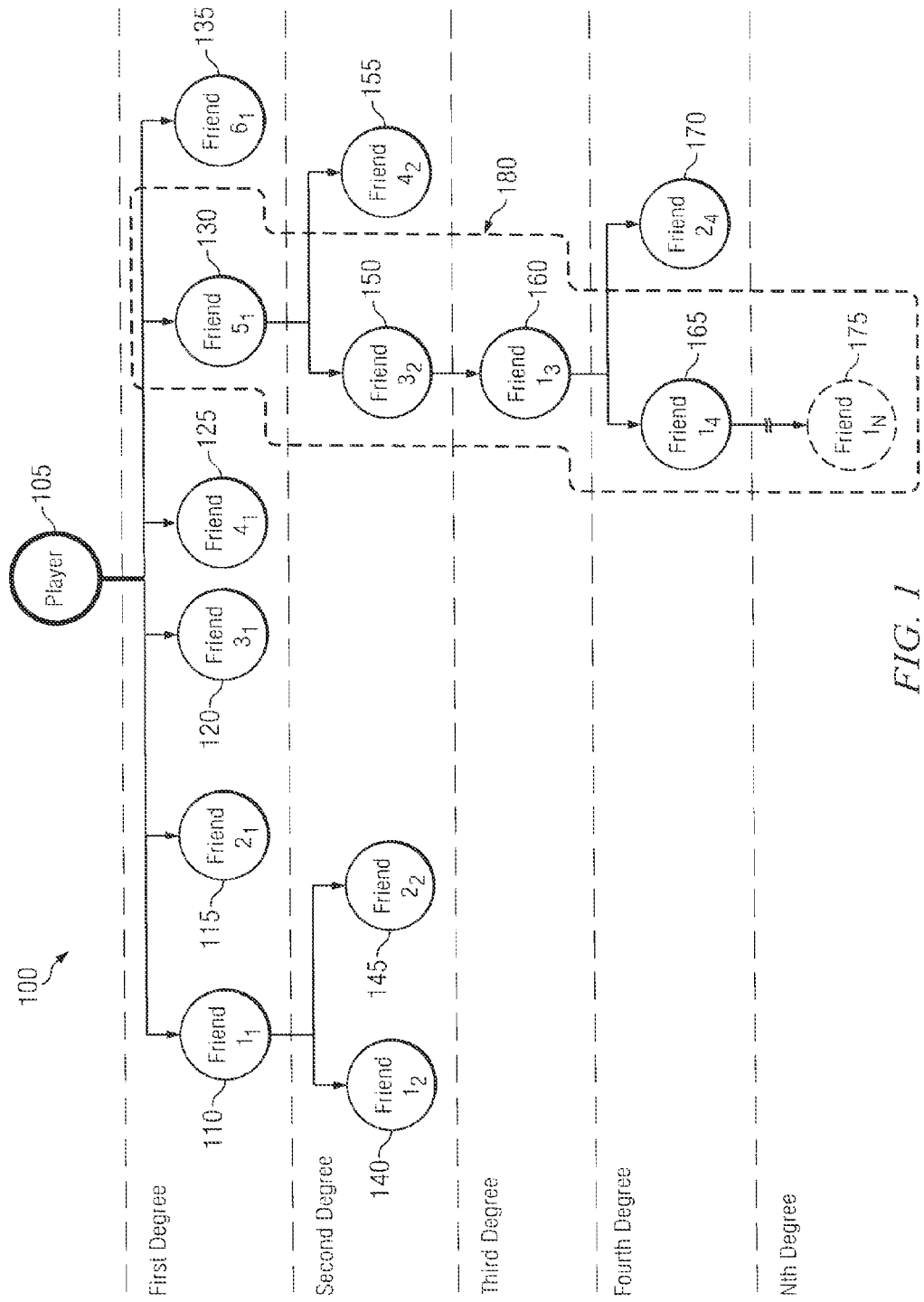
FIG. 1 depicts a schematic of a social network.

Game Systems, Social Networks, and Social Graphs

In an online multiplayer game, players control player characters (PCs), a game engine controls non-player characters (NPCs), and the game engine also manages player character state and tracks state for currently active (i.e., online) players and currently inactive (i.e., offline) players. A player character can have a set of attributes and a set of friends associated with the player character. As used herein, the terms "state" and "attributes" can be used interchangeably to refer to any in-game characteristic of a player character, such as location, assets, levels, condition, health, status, inventory, skill set, name, orientation, affiliation, specialty, and so on. The game engine uses player character state to determine the outcome of game events, sometimes also considering set or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine determines the outcome of a game event according to game rules (e.g., "a character with less than 5 health points will be prevented from initiating an attack"), based on character state and possibly also interactions of other current player characters and possibly also a random calculation. Engagements can include simple tasks (e.g., cross the river, shoot at an opponent), complex tasks (e.g., win a battle, unlock a puzzle, build a factory, rob a liquor store), or other events.

A game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. The social graph has a node for each entity, and edges to represent relationships between entities. A node in a social graph can represent any entity. The present disclosure assumes that at least one entity of a social graph is a player or player character in an online multiplayer game, though the present disclosure is intended to cover all types of social graph users.

The minimum number of edges required to connect a player (or player character) to another user is considered the degree of separation between them. For example, where the player and the user are directly connected (one edge), they are deemed to be separated by one degree of separation. The user would be a so-called "first degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "N-degree friend."

In one embodiment, the social graph is managed by the game networking system 620b managed by the game operator. In another embodiment, the social graph is part of a social networking system 620a managed by a third-party (e.g., Facebook, Friendster, Myspace, etc.). In yet another embodiment, a player has a social graph on both the game networking system 620b and the social networking system 620a, wherein the player can have a social network on the game networking system 620b that is a subset, superset, or independent of the player's social network on the social networking system 620a. In such combined systems, the game network system 620b can maintain social graph information with edge type attributes that indicate whether a given friend is an "in-game friend," a "social network friend," or both. The various embodiments disclosed herein are operable when the social graph is managed by a social networking system 620a, a game networking system 620h, or both.

Within the social graph, each player (or player character) has a social network. A player's social network includes all users in the social graph within $N_{max}$ degrees of the player, where $N_{max}$ is the maximum degree of separation allowed by either the social networking system 620a or the multiuser game engine 620b. In some embodiments, $N_{max}$ is unlimited and the player's social network is coextensive with the social graph. Unless otherwise specified, the term "friend" means any user in the social graph who is separated from the player by no more than $N_{max}$ degree of separation.

In a game system according to aspects of the present disclosure, in determining the outcome of a game event in a game being played by a player (or a group of more than one player), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on his team (e.g., the friends that are listed as being in the player's mob/gang/set/army/business/crew/etc. depending on the nature of the game) can be playing the online game and choose to confront Player B who has 20 friends on her team. In some embodiments, each player may only have first-degree friends on his or her team. In other embodiments, each player may also have second-degree and higher degree friends on his or her team. To resolve the game event, in some embodiments the game engine could total up the weapon strength of the seven members of Player A's team and the weapon strength of the 21 members of Player B's team and decide an outcome of the confrontation based on a random variable applied to a probability distribution that favors the side with the greater total. In some embodiments, all of this can be done without any other current active participants other than Player A (i.e., Player A's friends, Player, B, and Player B's friends could all be offline or inactive). In some embodiments, the friends in each player's team may see a change in their state as part of the outcome of the game event (e.g., if it goes well, they might share in the rewards or if it does not, they might suffer a loss of assets, such as health). In some embodiments, the game play mechanics might limit the downside (so that a player who plays eight hours a day benefitting off of their friends' assets does not totally kill off friends' characters where those friends might only infrequently play). In some embodiments, the state (assets, condition, level) of friends beyond the first degree are taken into account.

Details and descriptions of various aspects and advantages of the ability to associate with characters developed by associated members of an online social networking system within the constructs of an online multiplayer game when the associated members are not logged in to the online multiplayer game are described below.

FIG. 1 is a schematic of a social network 100 within a social graph according to various embodiments of the present disclosure. As shown, Player 105 can be associated, connected or linked to various other users, or "friends," within the social network 100. These associations, connections or links can track relationships between users within the social network 100 and are commonly referred to as online "friends" or "friendships" between users. Each friend or friendship in a particular user's social network within a social graph is commonly referred to as a "node," The details of social network 100 will be described in relation to an original or first Player 105. As used herein, the terms "player" and "user" can be used interchangeably and can refer to any user or character in an online multiuser game system or social networking system. As used herein, the term "friend" means any node within a player's social network.

As shown in FIG. 1, Player 105 has direct connections with several friends. When Player 105 has a direct connection with another individual that connection is referred to as a first-degree friend. In social network 100, Player 105 has six first-degree friends. That is, Player 105 is directly connected to Friend $1_1$ 110, Friend $2_1$ 115, Friend $3_1$ 120, Friend $4_1$ 125, Friend $5_1$ 130, and Friend $6_1$ 135. In a social graph, it is possible for individuals to be connected to other individuals through their first-degree friends (i.e., friends of friends). As described above, each edge required to connect a player to another user is considered the degree of separation. For example, FIG. 1 shows that Player 105 has four second-degree friends to which he is connected via his connection to his first-degree friends, Friend $1_1$ 110 and Friend $5_1$ 130. Second-degree Friend $3_2$ 150 is connected to Player 105 via his first-degree Friend $5_1$ 130. The limit on the depth of friend connections, or the number of degrees of separation for associations, that Player 105 is allowed is typically dictated by the restrictions and policies implemented within social network 100 or a social graph.

In various embodiments, Player 105 can have Nth-degree friends connected to him through a chain of intermediary degree friends as indicated by the outlined chain of friends 180. The outlined chain of friends 180, in addition to the first-degree and second-degree friends described above, has 3rd-degree (Friend $1_3$ 160), 4th-degree (Friend $1_4$ 165), and Nth-degree (Friend $1_N$ 175) friends. Various embodiments take advantage of and utilize the distinction between the various degrees or level of friendship relative to Player 105. For example, the degree of separation between Player 105 and another user may dictate how much of an in-game benefit Player 105 derives from connecting or associating with that particular user. In various embodiments, the in-game benefit is established passively, requiring only that Player 105 be connected with some number of first-degree friends.

Connections between Player 105 and other entities in the social graph can be built in several ways. In some embodiments, Player 105 can invite various entities into his first-degree level friends category within the infrastructure of a social network website or other server. In other embodiments, Player 105 can invite entities to join a social graph or network from within an online multiplayer game. In other embodiments, Player 105 can invite anyone from his social network 100 within the infrastructure of a social network to join a separate or connected online multiuser game.

Figure 9:
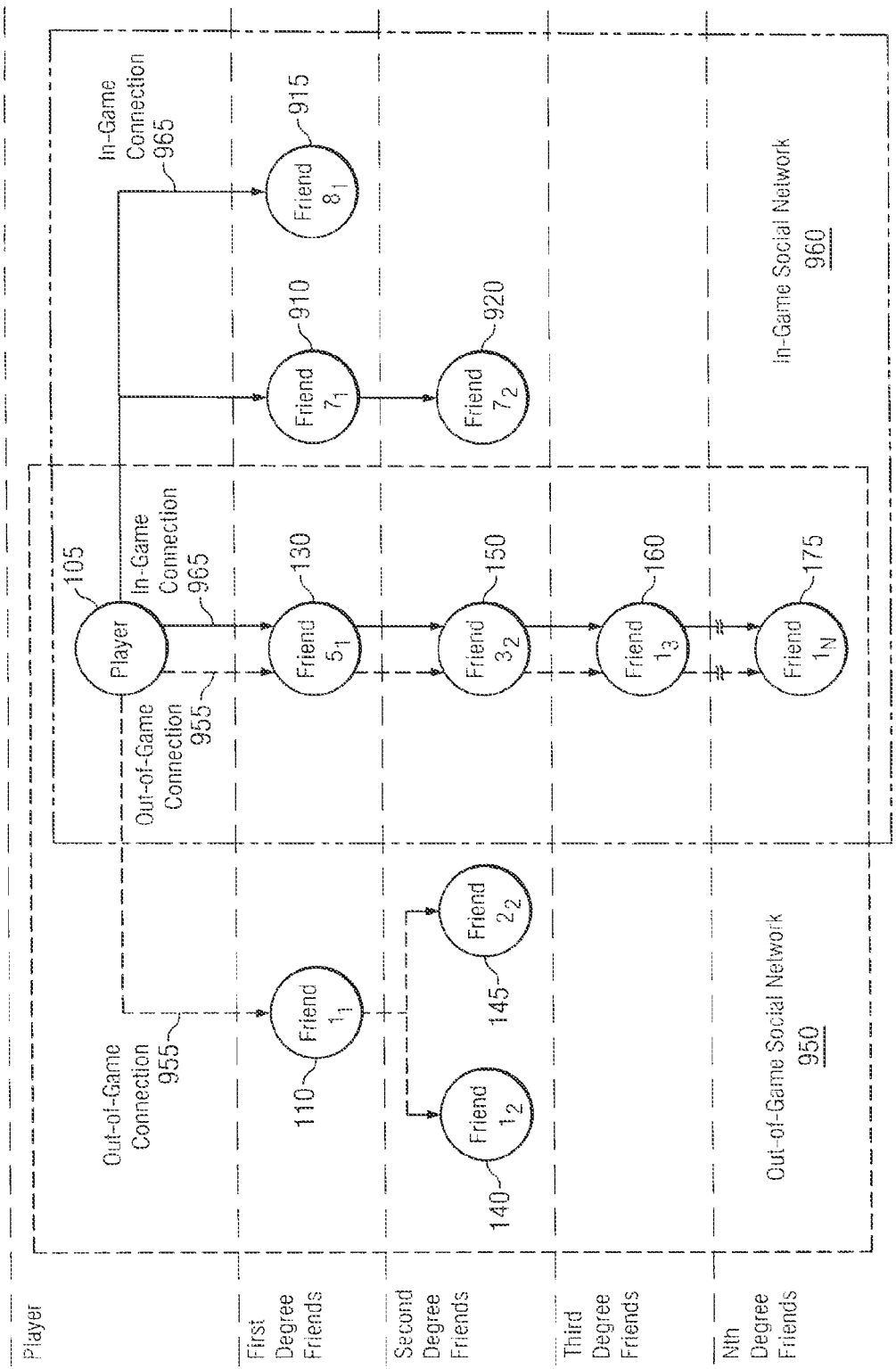
FIG. 9 depicts a schematic of an in-game social network and an out-of-game social network.

In some embodiments, a player (or player character) can have a social graph within an online multiplayer game that is maintained by the game engine and another social graph maintained by a separate social networking system. FIG. 9 depicts a schematic example of an in-game social network and an out-of-game social network. In this example, Player 105 has out-of-game connections 955 to a plurality of friends, forming an out-of-game social network 950. Here, Friend $1_1$ 110 and Friend $5_1$ 130 are first-degree friends with Player 105 in Player 105's out-of-game social network 950. In this example, Player 105 also has in-game connections 965 to a plurality of players, forming an in-game social network 960. Here, Friend $5_1$ 130, Friend $7_1$ 910, and Friend $8_1$ 915 are first-degree friends with Player 105 in Player 105's in-game social network 960. In some embodiments, it is possible for a friend to be in both the out-of-game social network 950 and the in-game social_network 960. Here, Friend $5_1$ 130 has both an out-of-game connection 955 and an in-game connection 965 with Friend 105, such that Friend $5_1$ is in both Player 105's in-game social network 960 and Player 105's out-of-game social network 950.

As with other social networks, Player 105 has second-degree and higher-degree friends in both his in-game and out of game social networks, in some embodiments, it is possible for Player 105 to have a friend connected to him both in his in-game and out-of-game social networks, wherein the friend is at different degrees of separation in each network, For example, if Friend $2_2$ 145 had a direct in-game connection with Player 105, Friend $2_2$ 145 would be a second-degree friend in Player 105's out-of-game social network, but a first-degree friend in Player 105's in-game social network.

A multiuser online game can access both in-game social networks 960 and out-of-game social networks 950, and the embodiments disclosed herein are operable using either or both.

In-Game Benefits Derived from In-Game Associations

In some embodiments, when Player 105 has established a social network 100 within a particular online multiuser game, Player 105 can be granted various in-game rewards or benefits. For example, for each entity invited to play an online multiuser game, Player 105 is granted the ability to associate with that entity within the online multiuser game, thereby creating a directly link between Player 105 and that entity in the social network 100. This association can have its own benefits and drawbacks. In some embodiments, Player 105 may be required to be associated with a certain number of entities before being allowed to engage in various game events within the game (e.g., quests, missions, etc.). For example, Player 105 may be required to be associated with at least ten other entities before he will be allowed to undertake the next level of game events. In other embodiments, Player 105 may not be required to fulfill a minimum number of associated entities to engage in a particular game event; however, Player 105 will receive incremental in-game benefits or distribute in-game damages based on the number of in-game associations Player 105 has with other entities playing the game. For example, a game task may involve moving a heavy object. If Player 105 attempts to complete this task alone, he might have a small percentage chance to complete this task based on his strength attribute. However, if Player 105 is associated with other entities in the game, their strength attributes can be added to Player 105's either directly or fractionally, thereby increasing the percentage chance of completing the task.

Group Tasks

Game events can be any kind of action, mission, fight, problem or puzzle attempted or executed in an online multiplayer game. Game events can include, but are not limited to, simple single-action tasks, extended missions comprising multiple individual tasks, journeys, and level-defining fights.

The ability of Player 105 to attempt, undertake, engage or complete game events can be facilitated or enhanced by forming or being assigned to groups that include one or more NPCs. Just as game events can be completed more easily with real-time online cooperation with live players pooling their assets and abilities, a single player (or player character) associated with various NPCs can utilize the various attributes of those NPCs to complete event tasks at that time.

Associating Players for Asynchronous Game Play

In various embodiments, Player 105 can take advantage of the assets and abilities of a friend in his social network in an asynchronous fashion. For example, Friend $3_1$ 120 may have developed or acquired certain skills or assets that may be helpful to Player 105's successful completion of a game event undertaken in a particular online multiplayer game. Such skills can include, but are not limited to, the ability to pick locks in the game space or the ability to be invisible or speak different languages within the game space. Similarly, Friend $3_1$ 120 may have acquired assets or attributes including, but not limited to, increased health, increase stamina, in-game currency or special items. While playing the game, Player 105 can associate himself with Friend $3_1$ 120, regardless of whether Friend $3_1$ 120 is currently also playing the game, and thereby take advantage of the assets and abilities of Friend $3_1$ 120.

In some embodiments, Player 105 can reassociate himself with Friend $3_1$ 120 each time Player 105 logs on to play the game and thereby take advantage of changes in Friend $3_1$ 120's assets and abilities. For example, while Player 105 is off-line, Friend $3_1$ 120 can evolve and change according to the friend's own individual game play. Friend $3_1$ 120 may participate in or play a particular multiplayer online game while Player 105 is not. During Friend $3_1$ 120's independent game play, Friend $3_1$ 120 can advance through the game and thus acquire additional experience points, health, stamina or other in-game benefits and assets. When Player 105 logs on to play the game again and associates himself again with Friend $3_1$ 120, Player 105 will be able to take advantage of any of the new attributes (e.g., assets, abilities) that Friend $3_1$ 120 has acquired since the last time Player 105 logged on.

In some embodiments, the sharing of character attributes can occur in both directions. That is when Player 105 associates with one of his friends in his social graph 100, both players can benefit from the attributes of one another's characters. For example, Friend $3_1$ 120 can benefit from the attributes Player 105. In other embodiments, Friend $3_1$ 120 can permanently gain or share in various in-game benefits or advancements, such as in-game currency or increased experience points, achieved by Player 105's game play. In other embodiments, Friend $3_1$ 120 can also share or absorb any potential in-game detriments or damage. Such embodiments will be described in more detail below in regards to distributed damage.

in other embodiments, Friend $3_1$ 120 can choose whether to benefit his character based on the game play of Player 105. This allows the friends of Player 105 to control how their characters evolve. For instance, some embodiments may allow the friends of Player 105 to determine which benefits or detriments they would like to risk. Additionally, certain risk can be assigned when Player 105 opts to take advantage of any potential benefits by making the associated friend susceptible to potential damage or detriments. For instance, if Friend $3_1$ 120 would like to receive a share of any in-game currency acquired while Friend $3_1$ 120 is associated with Player 105's game play, then Friend $3_1$ 120 may also be susceptible to absorbing any damage or detriments that his character may be exposed to while it is associated in Player 105's game play.

In some embodiments, the friend that Player 105 wants to associate with can have an opportunity to accept or decline such association. In some embodiments, a single association request will cover all future in-game activities performed by Player 105, allowing Player 105 to continuously share benefits and detriments with the friend. In other embodiments, each game event performed by Player 105 for which he would like to be associated with the character of a friend can require an individual request and subsequent approval for that task.

Proxies

One way that a player (or player character) can take advantage of the attributes of his friends (or the friends' PCs) is through the use of computer-controlled NPCs that represent his friends. The amount or degree of in-game advantages or benefits that Player 105 derives from each of his friends can depend on the attributes of his friends (or the attributes of their PCs). In some embodiments, Player 105 can derive in-game benefits from associations with his friends even if they are not logged in or playing the game in real time with Player 105. In such embodiments, the friend can act like a NPC associate controlled by game engine. When a friend's character is used to derive in-game benefits in this manner, the associated player's character is referred to as a "friend proxy automated character" or simply as a "proxy." A proxy is a type of NPC and is controlled by the game engine, however it differs from regular NPCs in that the proxy is based on another user within the game, and it can maintain a relationship with that user. The proxy can be created by the game engine and run by the player regardless of whether the friend the proxy is based on is actively using the game.

In some embodiments, where a player and a friend are playing in real time with each other, the game engine can create a proxy of the friend as soon as the friend logs off from the game, such that the player can continue play without losing the benefits derived from playing with his friend, For example, Player 105 and Friend $3_1$ 120 can play together in a multiuser online game at the same time and thereby assist each other within the game. If Friend $3_1$ 120 logs off from the game, the game engine can immediately create a proxy of Friend $3_1$ 120, wherein this proxy is controlled by the game engine as an NPC and can continue to assist Player 105 in his game play. In some embodiments, this process is opaque to Player 105, such that he does not realize that the game engine has taken control of his adventuring companion.

FIG. 2 illustrates a proxy attributes page 200 according to various embodiments of the present disclosure. The proxy's attributes are determined, at least in part, by the corresponding attributes of the friend (or the friend's PC) the proxy is based on. In some embodiments, the proxy's attributes are determined, at least in part, by the degree of separation between the player and the friend. In the example illustrated by FIG. 2, the Proxy $5_1$ 230 is described by proxy attributes page 200. Proxy $5_1$ 230's attributes are based, at least in part, on Friend $5_1$ 130. Proxy $5_1$ 230 is owned by Player 105, who is a first-degree friend with Friend $5_1$ 130. Proxy attributes page 200 comprises information about a number of proxy attributes. For example, information 225 includes the name, source, owner, orientation, specialty, and education. Proxy attributes page 200 can also include a listing of the proxy's assets 215 such as its weapons, tools, cash, powers and gifts/favors. In some embodiments, proxy attributes page 200 can include a recent activity list 220. The recent activity list 220 can include, for example, information about updates to Proxy $5_1$ 230's attributes, and recent activities or tasks Proxy $5_1$ 230 has completed with Player 105. The foregoing list of possible pieces of information that can be included in the proxy attributes page 200 is not exhaustive. Any or all other useful information regarding Proxy $5_1$ 230 can be included in the proxy attributes page 200.

Proxy attributes page 200 can also include relevant dates and news about the day Proxy $5_1$ 230 was created, the date Friend $5_1$ 130 was last logged on, the last time Proxy $5_1$ 230 was updated by Player 105, as well as any other news regarding the proxy. News regarding Proxy $5_1$ 230 or Friend $5_1$ 130 can include any developments, evolution or advancements made by Friend $5_1$ 130 to the attributes of Proxy $5_1$ 230.

In some embodiments, the proxy can evolve according to the player (or PC) who owns the proxy or the friend (or the friend's PC) the proxy is based on. For example, if either Player 105 or Friend $5_1$ 130 increases their skills, assets, proficiency, or level, Proxy $5_1$ 230's attributes can also increase, according to the game logic. In some embodiments, the evolution of Proxy $5_1$ 230 occurs asynchronously with the game play of Player 105. In other embodiments, Proxy $5_1$ 230's attributes can be frozen in time at the moment Player 105 adds the proxy to his proxy list 400. In yet other embodiments, Proxy $5_1$ 230's attributes page 200 is initialized with the attributes of Friend $5_1$ 130 at the time Player 105 adds Friend $5_1$ 130 to his social graph, however the attributes of Proxy $5_1$ 230 can evolve in response to the game play of Player 105 and Friend $5_1$ 130. As such, even though multiple proxies based on Friend $5_1$ 130 exist (each owned by a different player), each proxy of Friend $5_1$ 130 is unique to its owner. In this example, Proxy $5_1$ 230 is unique to Player 105. Other players (or PCs) may have proxies based on Friend $5_1$ 130 that are unique to them, and the attributes of these proxies can evolve depending on the game play of each of their respective owners, developing independently of Player 105's Proxy $5_1$ 230.

Association of Friend Proxy Automated Character

In various embodiments, the proxy attributes page 200 can be one of many proxy attributes pages representing proxies based on multiple friends (of PCs of friends) within Player 105's social network 100. In such embodiments, it is possible for Player 105 to select various proxies representing various friends (or their PCs) within Player 105's social network 100 to be included in a group tailored to or conceived with a particular game event in mind.

Figure 5:
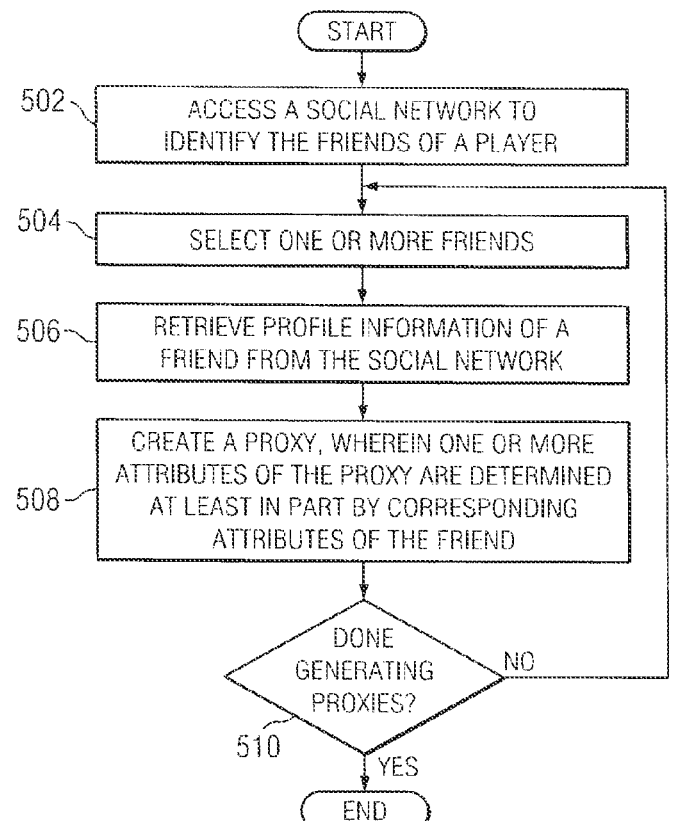
FIG. 5 shows a flowchart illustrating an example method for generating a proxy.

FIG. 5 shows a flowchart of an example method for generating a proxy according to various embodiments of the present disclosure. In some embodiments, the group of proxies can be assembled by accessing 502 Player 105's social network 100 and selecting 504 one or more friends (or their PCs) from the social network according to a computer-implemented game logic. In this embodiment, the friends could be selected by Player 105 or by the game engine. In either case, the selection of friends could be deter at least in part, by the degree of connections between Player 105 and the selected friends, as well as by the type of connection between Player 105 and the selected friends (e.g., whether Player 105 and the selected friend have an in-game connection 965 or an out-of-game connection 955 or both). The game engine could then retrieve 506 the profile information of the selected friends from the social networking system 620a and create 508 a proxy attributes pages 200 of the proxies associated with the selected friends. These proxies could then be stored in a proxy list 400, which could be later referenced and used in the game. At this point 510, game play can continue or more friends can be selected to generate more proxies. In other embodiments, the group of proxies can be assembled in advance by the game engine and stored for reference, The game engine could create proxies of any or all friends in Player 105's social network.

To resolve some game events, Player 105 might use all the proxies in his proxy list, To resolve other events, the game rules might only allow Player 105 to utilize a subset of his proxy list. For example, Player 105 could select this subset of proxies by checking or clicking the associated selection box or radio button 205 within the proxy attributes pages 200 of each proxy that Player 105 would like to include in the group.

In some embodiments, a group of proxies assembled by Player 105 can have inherent positions, roles or ranks Proxies can be assigned to these positions/roles/ranks by Player 105 or by the game engine according to a game logic. For example, position/rank box 210 can be used by Player 105 to indicate which role (e.g., bodyguard), position (e.g., center midfielder), or rank (e.g., fifth) he wishes a particular proxy to occupy within the group. Position/rank box 210 can also be used to indicate or assign how damage or benefits will be distributed or how assets or abilities will be shared in a whole or fractional manner. A more detailed description of distributed damage and benefits and shared assets and abilities will be discussed below.

In some embodiments, a player's proxies and proxy list remain associated with the player across games. For example, Player 105 may play gangster-style online role-playing game ("RPG"), wherein he has various proxies associated with him that are stored in a proxy list 400. Player 105 may also play a fantasy-style online RPG, wherein the game networking system for the fantasy-style online RPG can access Player 105's proxy list 400 from the gangster-style online RPG. This allows Player 105 to use the same proxies and proxy list 400 in both the gangster-style online RPG and the fantasy-style online RPG.

Figure 3:
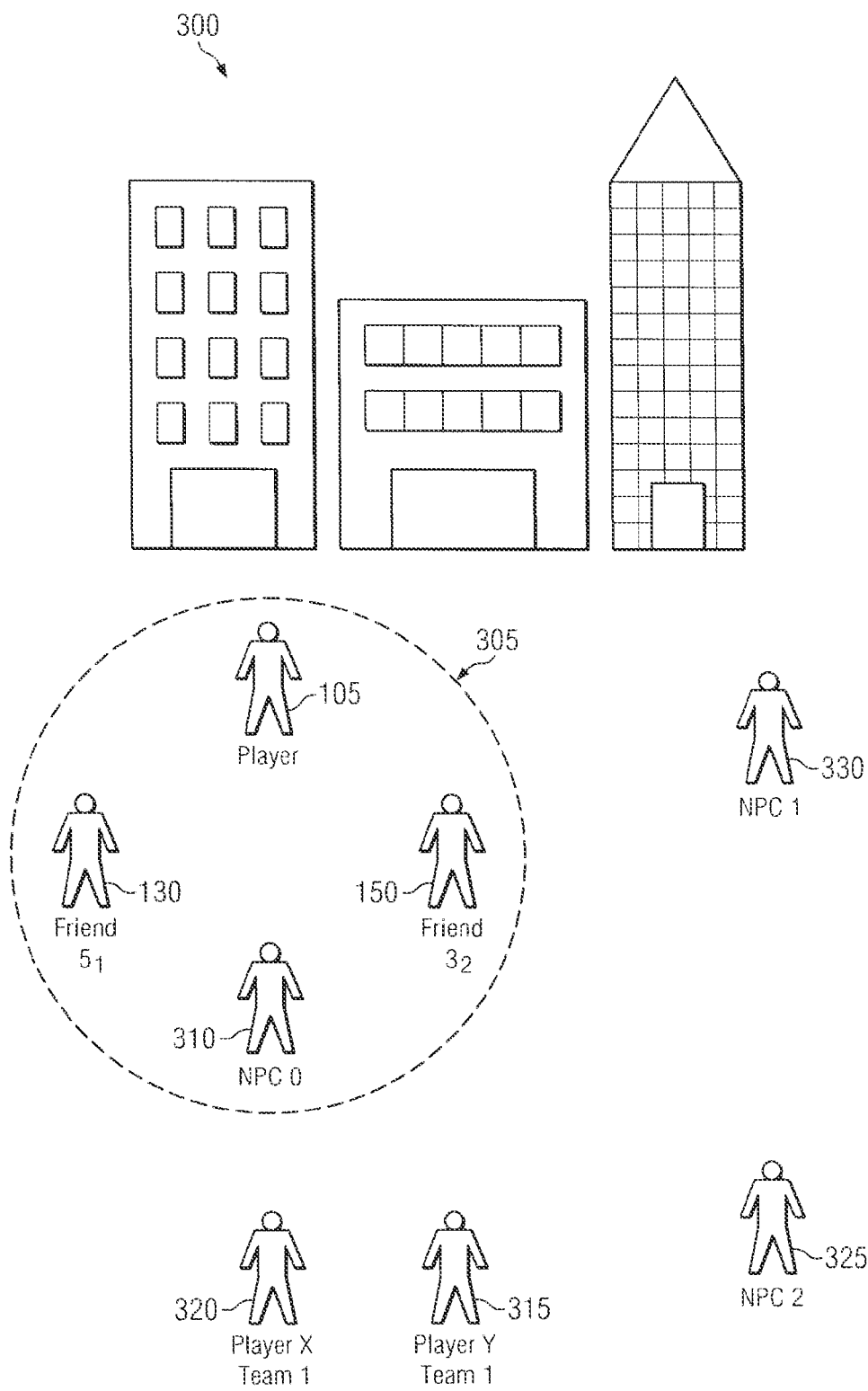
FIG. 3 depicts an example game scene and character interactions and associations.

FIG. 3 depicts a scenario 300 in which Player 105 can interact with and be associated with other players (or PCs), proxies, and regular NPCs. As shown in FIG. 3, Player 105 can be associated with Friend $5_1$ 130, Friend $3_2$ 150, and NPC 0 310. This association is represented by circle 305 and can be referred to as a team, group, troop, gang, mob or any other appropriate designation that would indicate the association between Player 105 and the other characters. Player 105 can interact with computer-controlled NPCs, such as NPC 1 330 and NPC 2 325. Interactions between Player 105 and computer-controlled NPCs can be a mechanism within the game with which to assign tasks, missions, fights, or other game events to association 305.

In addition, Player 105 and association 305 can interact with other players (or PCs) within the online multiplayer game space, such as Player X 320 and Player Y 315. In various embodiments, Player X 320 and Player Y 315 can be associated with their own teams or be associated onto the same team. Furthermore, Player X 320 and Player Y 315 can each be associated with their own team of proxies and regular NPCs. Scenario 300 depicted in FIG. 3 illustrates avatar or icon-based game play within an online multiplayer game. However, various embodiments can also include spreadsheet, other text or graphics-based online multiplayer game environments.

Distributed Benefits and Detriments; Fractional Benefits and Detriments

In various embodiments, proxies can be used byr Player 105 to distribute in-game damage or detriment incurred by Player 105. For example, Player 105 may have a health value of 100 and Proxy $5_1$ 230 may also have a health value of 100. Collectively, Player 105 and Proxy $5_1$ 230 would have a health value of 200. In a scenario in which Player 105 is involved in a battle and absorbs 90 points of damage, that damage can be distributed, either in whole or partially, to Proxy $5_1$ 230.

The degree to which a proxy associated with Player 105 absorbs damage, expends in-game currency, depletes in-game special items, or decreases his health value can depend on the degree of separation between Player 105 and the friend the proxy is based on. For example, if Friend $5_1$ 130 is a first-degree friend of Player 105, then Proxy $5_1$ 230 may absorb ½ of any damage or detriment incurred by Player 105, or in terms of the example given above absorb a decrease of 45 in health value. In another example, if the Friend $1_N$ 175 is an Nth-degree friend, then Proxy $1_N$ 476 might absorb 1/(1+N) of the damaged incurred by Player 105. In some embodiments, the damage or detriment suffered by a proxy is also suffered by the friend the proxy is based on. As with the proxy, the degree to which a friend's character suffers damage or detriment inflicted on a proxy can depend on the degree of separation between the friend and the player using the proxy based on the friend. For example, in the above example where Proxy $5_1$ 230 absorbs 45 points of damage, Friend $5_1$ 130 may also suffer 45 points of damage. Similarly, against using the above example, Friend $1_N$ 175 might only suffer 90/(1+N) points of damage. One of ordinary skill in the art will recognize that various algorithms, schemes, and formulas can be used to determine distributed damage and detriments to various degrees of separation for proxies associated with Player 105.

Figure 4:
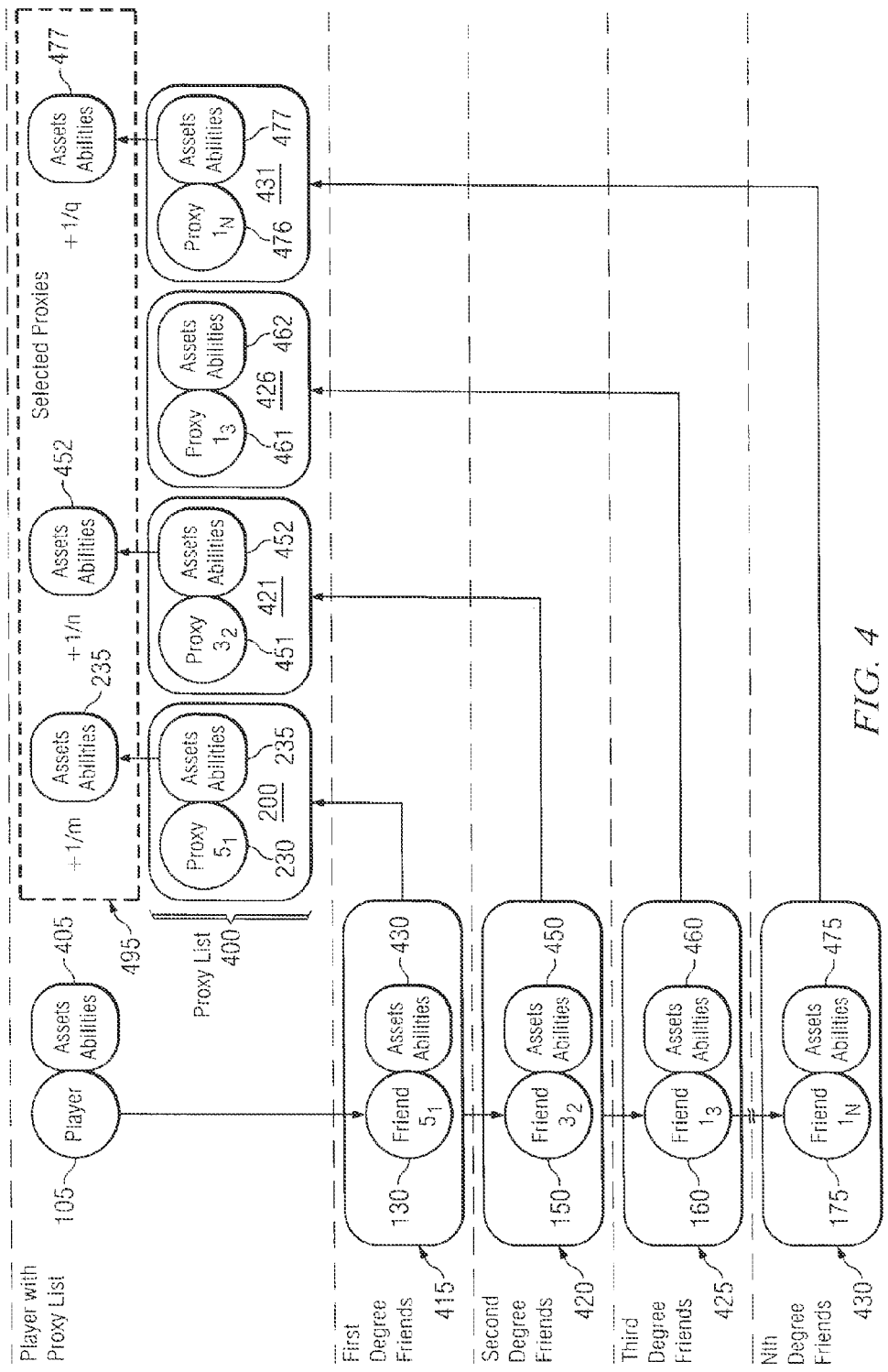
FIG. 4 depicts an example proxy list and a scheme for attributing a player character in-game benefits.

Similarly, the degree to which a proxy associated with Player 105 acquires in-game benefits can also depend on the degree of separation between Player 105 and the friend (or the friend's PC) the proxy is based on. FIG. 4 illustrates one scheme of attributing fractional benefits and detriments to Player 105. Player 105, having assets and abilities 405, can have his abilities augmented by attributing a fractional portion of any or all proxies associated with Player 105. For instance, Player 105's team 180 consists of Friend $5_1$ 130, Friend $3_2$, 150, Friend $1_1$ 160, Friend $1_4$ 165 (not shown in FIG. 4), and Friend $1_N$ 175. These friends, via their proxies, can share in-game benefits or detriments with Player 105 according to the scheme depicted in FIG. 4. In some embodiments, the number of proxies associated with Player 105 can be limited, while in other embodiments, the number of associated proxies can be unlimited and include proxies based on any friend (or PC of a friend) within Player 105's social network 100. Depending on the game logic, some or all of the proxies in Player 105's proxy list 400 can be utilized for a specific task. In the example shown in FIG. 4, only Proxy $5_1$ 230, Proxy $3_2$ 451, and Proxy $1_N$ 475 have been selected for use.

As shown in FIG. 4, each of the proxies associated with Player 105 has a corresponding list of assets and abilities listed in a proxy attributes page. For example, Proxy $5_1$ 230 has assets and abilities 235 listed in attributes page 200. Proxy $3_2$ 451 has assets and abilities 452 listed in attributes page 421. Proxy $1_3$ 461 has assets and abilities 462 listed in attributes page 426. Proxy $1_N$ 476 has assets and abilities 477 listed in attributes page 230.

Player 105 can augment his assets and abilities 405 by adding the assets and abilities of the selected proxies. In various embodiments, assets and abilities 405 can be augmented by adding a fraction of each of the assets and abilities of the selected proxies. FIG. 4 illustrates a scheme for distributing or collecting fractional in-game benefits and detriments from the selected proxies. For example, in FIG. 4, the assets and abilities 405 of Player 105 can be augmented by adding 1/m of Proxy $5_1$ 230's assets and abilities 235, 1/n of Proxy $3_2 451$'s assets and abilities 452, and 1/q of Proxy $1_N$ 476's assets and abilities 477. Similarly, when benefit or detriment is conveyed to Player 105, the benefit or detriment can be fractionally distributed to the proxy by the same fraction. In some embodiments, the benefit or detriment fractionally distributed to a proxy can also be fractionally distributed to the friends (or their PCs) those proxies are based on. For example, in the above example, if Proxy $5_1$ 230 receives 1/m of the benefit received by Player 105, Friend $5_1$ 130 may also receive 1/m of the same benefit.

In some embodiments, the values of m, n, and q are equal. In other embodiments, the values of m, n, and q vary, at least in part, according to the degrees of separation between Player 105 and the friend associated with the respective proxy. In yet other embodiments, the values of m, n, and q can be set arbitrarily, correspond to some other game state or dictated by Player 105's assets and abilities 405. Some, all, or none of the fractions of each of the assets and abilities of the proxy's can be the same. In further embodiments, the values of m, n, and q can be equal to the number of proxies selected 495. For example, in the arrangement illustrated in FIG. 4, values of m, n, and q can be equal to 3, corresponding to the three proxies selected by Player 105. One of ordinary skill in the art will recognize that various algorithms, schemes, and formulas can be used to determine these fractions.

Systems and Methods

In various example embodiments, one or more described web pages may be associated with a social networking system or game networking system. However, alternate embodiments may have application to the retrieval and rendering of structured documents hosted by any type of network addressable resource or web site. Additionally, as used herein, a "user" may be an individual, a group, or another entity (such as a business or third party application).

Figure 6:
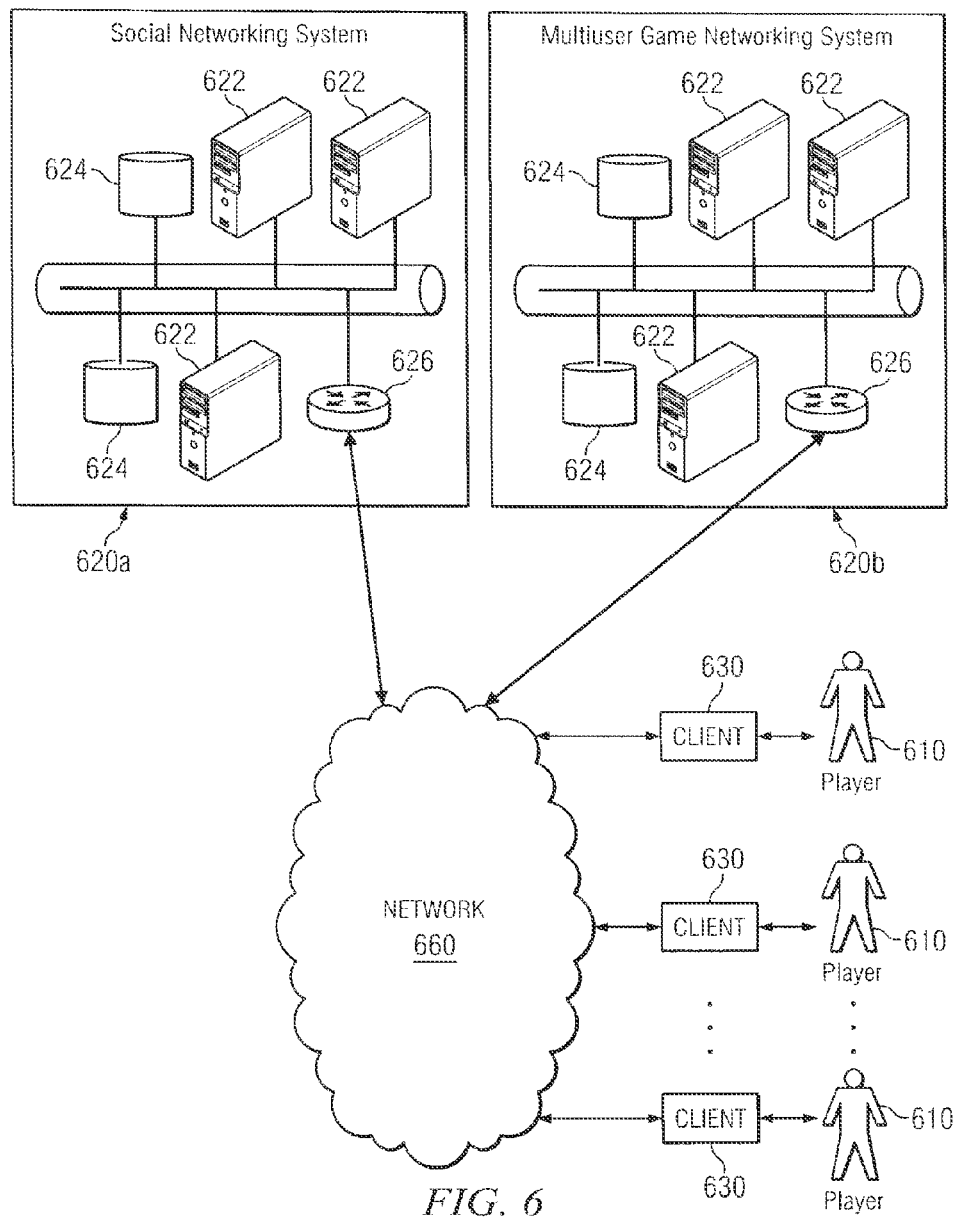
FIG. 6 illustrates an example network environment.

Particular embodiments may operate in a wide area network environment, such as the Internet, including multiple network addressable systems. FIG. 6 illustrates an example network environment, in which various example embodiments may operate. Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 6 illustrates, particular embodiments may operate in a network environment comprising social networking system 620a, multiuser game networking system 620b, and one or more client devices 30. However, a social networking system separate from the multiuser game networking system is not necessary. It is possible for the systems to be combined, such that the social networking system and the multiuser game networking system are part of the same system. Consequently, hereinafter, social networking systems 620a and multiuser game networking system 620b may be referred to simply as networking system 620. Client devices 30 are operably connected to the network environment via a network service provider, a wireless carrier, or any other suitable means.

In one example embodiment, networking system 620 comprises computing systems that allow users to communicate or otherwise interact with each other and access content, such as a multiuser online game, game player profiles, social network profiles, and other content as described herein. Networking system 620 is a network addressable system that, in various example embodiments, comprises one or more physical servers 622 and data stores 624. The one or more physical servers 622 are operably connected to computer network 660 via, by way of example, a set of routers and/or networking switches 626. In an example embodiment, the functionality hosted by the one or more physical servers 622 may include web or HTTP servers, FTP servers, as well as, without limitation, web pages and applications implemented using Common Gateway Interface (CGI) script, PHP, Hyper-text Preprocessor (PHP), Active Server Pages (ASP), Hyper Text Markup Language (HTML), Extensible Markup Language (XML), Java, JavaScript, Flash, ActionScript, Asynchronous JavaScript and XML (AJAX), and the like.

Physical servers 622 may host functionality directed to the operations of networking system 620. By way of example, networking system 20 may host a website that allows one or more users, at one or more client devices 30, to access a multiuser online game, access an online social network, as well as communicate and interact with one another via the website. Hereinafter servers 622 may be referred to as server 622, although server 622 may include numerous servers hosting, for example, networking system 620, as well as other content distribution servers, data stores, and databases. Data store 624 may store content and data relating to, and enabling, operation of the networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses.

Data store 624 may include data associated with different networking system 620 users and/or client devices 630. In particular embodiments, the networking system 20 maintains a user profile for each user of the system 620. User profiles include data that describe the users of a network, which may include, for example, proper names (first, middle and last of a person, a trade name and/or company name of a business entity, etc.), biographic, demographic, and other types of descriptive information, such as work experience, educational history, hobbies or preferences, geographic location, and additional descriptive data. By way of example, user profiles may include a user's birthday, relationship status, city of residence, and the like. The system 620 may further store data describing one or more relationships between different users. The relationship information may indicate users who have similar or common work experience, group memberships, hobbies, or educational history. A user profile may also include privacy settings governing access to the user's information is to other users.

Client device 630 is generally a computer or computing device including functionality for communicating (e.g., remotely) over a computer network. Client device 630 may be a desktop computer, laptop computer, personal digital assistant (PDA), in or out-of-car navigation system, smart phone or other cellular or mobile phone, or mobile gaming device, among other suitable computing devices. Client device 630 may execute one or more client applications, such as a web browser (e.g., Microsoft Internet Explorer, Mozilla Firefox, Apple Safari, Google Chrome, and Opera, etc.), to access and view content over a computer network. In particular implementations, the client applications allow a user of client device 630 to enter addresses of specific network resources to be retrieved, such as resources hosted by networking system 620. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications and other objects that can be embedded within the page. Generally, a webpage may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

Networking system 620 may include a multitude of features with which users at remote clients 630 may interact during user sessions. In particular embodiments, these features may be implemented as web applications and may utilize JavaScript and CSS resources requested from servers 622 as well as other external servers or data stores. The web applications or resources may be embedded in various underlying or base web pages served to remote clients, such as in frames or iFrames, sections or "divs" and the like. By way of example, a computer-implemented game may be implemented as a FLASH object that is embedded into an HTML document and executable within the context of a client application, such as a browser.

In particular embodiments, the networking system 620 maintains in data store 624 a number of objects for the different kinds of items with which a user may interact while accessing networking system 620. In one example embodiment, these objects include game network user profiles, social network user profiles, application objects, and message objects (such as for wall posts, emails and other messages). In one embodiment, an object is stored by the system 620 for each instance of its associated item. These objects and the actions discussed herein are provided for illustration purposes only, and it can be appreciated that an unlimited number of variations and features can be provided on a networking system 620.

When a user at a client device (e.g., client device 630) desires to view a particular web page (hereinafter also referred to as target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client computing device 630. The request may also include location information identifying a geographic location of the user's client device or a logical network location of the user's client device. The request may also include a timestamp identifying when the request was transmitted.

Figure 7:
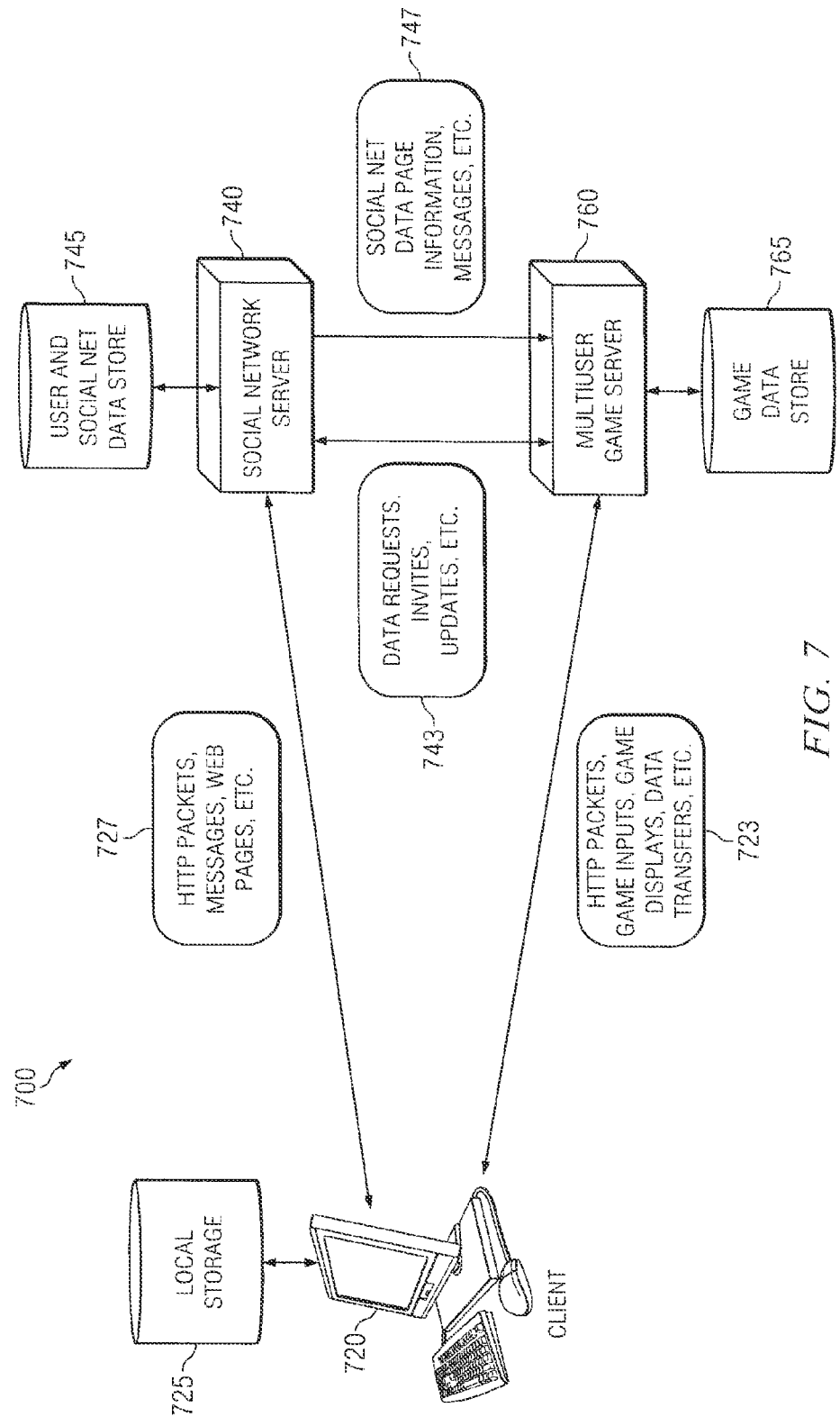
FIG. 7 depicts a schematic of a system and data flow for operating an online multiplayer game.

FIG. 7 depicts a schematic of system 700 and data flow between the components of system 700 for operating an online multiuser game. System 700 can include a client system 720, a social network server 740 and multiuser game server 760. Client system 720, social network server 740 and multiuser game server 760 can each have a corresponding data store such as local storage medium 725, user and social network storage medium 745 and game data storage medium 765, respectively. Client system 720 can communicate with social network server 740 to receive web pages, messages, etc. Additionally, client system 720 can transmit data to and receive data from 723 (including game inputs, team displays, data transfers, etc.) multiuser game server 760. In a similar fashion, multiuser game server 760 and social network server 740 can communicate HTTP packets 743 including data requests, invites, updates, etc. with social network server 740. At some other time, or at the same time, social network server 740 can communicate social network data, page info, messages, etc. data 747 with multiuser game server 760. As mentioned above, communication between client system 720, social network server 740 and multiuser game server 760 can occur over any appropriate electronic communication medium.

Figure 8:
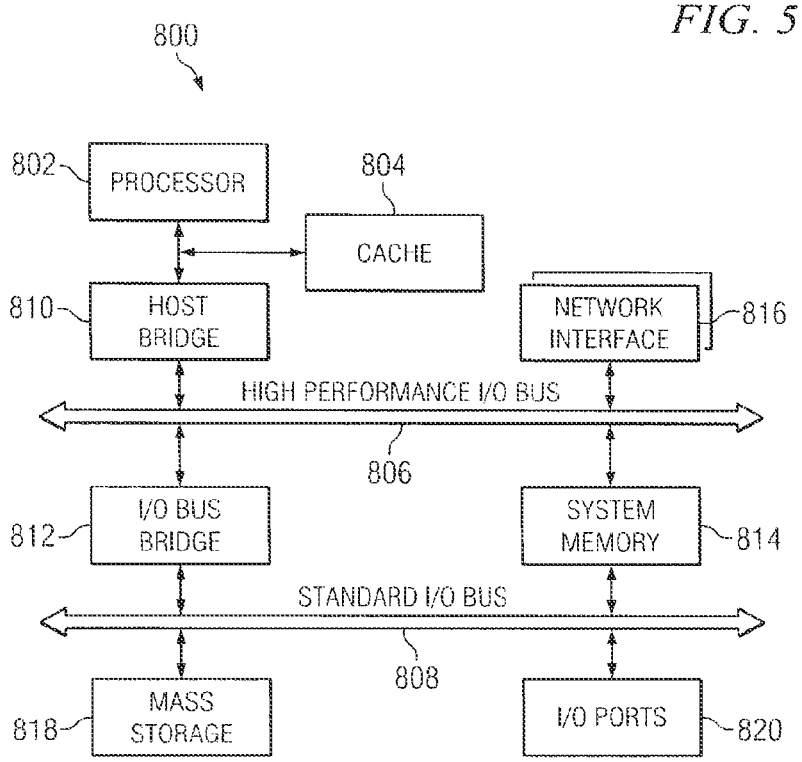
FIG. 8 illustrates an example computer system architecture.

FIG. 8 illustrates an example computing system architecture, which may be used to implement a server 622 or a client device 630 (or each node of a distributed computing system). In one embodiment, hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 908. A host bridge 810 may couple processor 802 to high performance I/O bus 806, whereas I/O bus bridge 812 couples the two buses 806 and 908 to each other. A system memory 814 and one or more network/communication interfaces 816 couple to bus 806. Hardware system 800 may further include video memory (not shown) and a display device coupled to the video memory. Mass storage 818, and I/O ports 820 couple to bus 808. Hardware system 800 may optionally include a keyboard and pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 8023) network, a backplane, etc. Mass storage 818 provides permanent storage for the data and programming instructions to perform the above-described functions implemented in the servers 622, whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures; and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments may not require nor include all of the above components. For example, the peripheral devices shown coupled to standard I/O bus 908 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with various embodiments. The term "processing system" refers to a single processing device or a group of inter-operational processing devices. Some examples of processing devices are integrated circuits and logic circuitry. Those skilled in the art are familiar with instructions, computers, and storage media.

Figure 10:
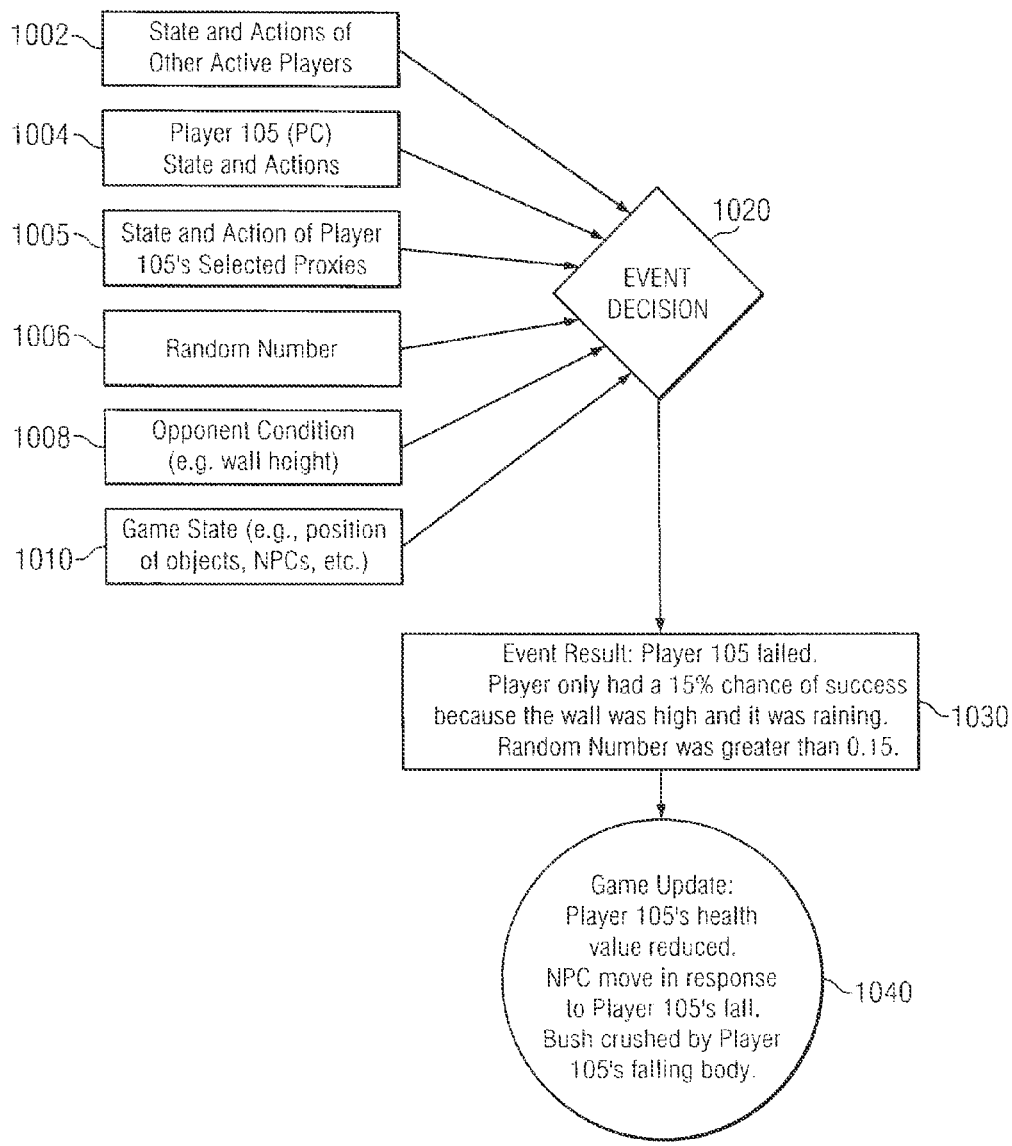
FIG. 10 depicts a schematic of operating an online multiplayer game.
Figure 11:
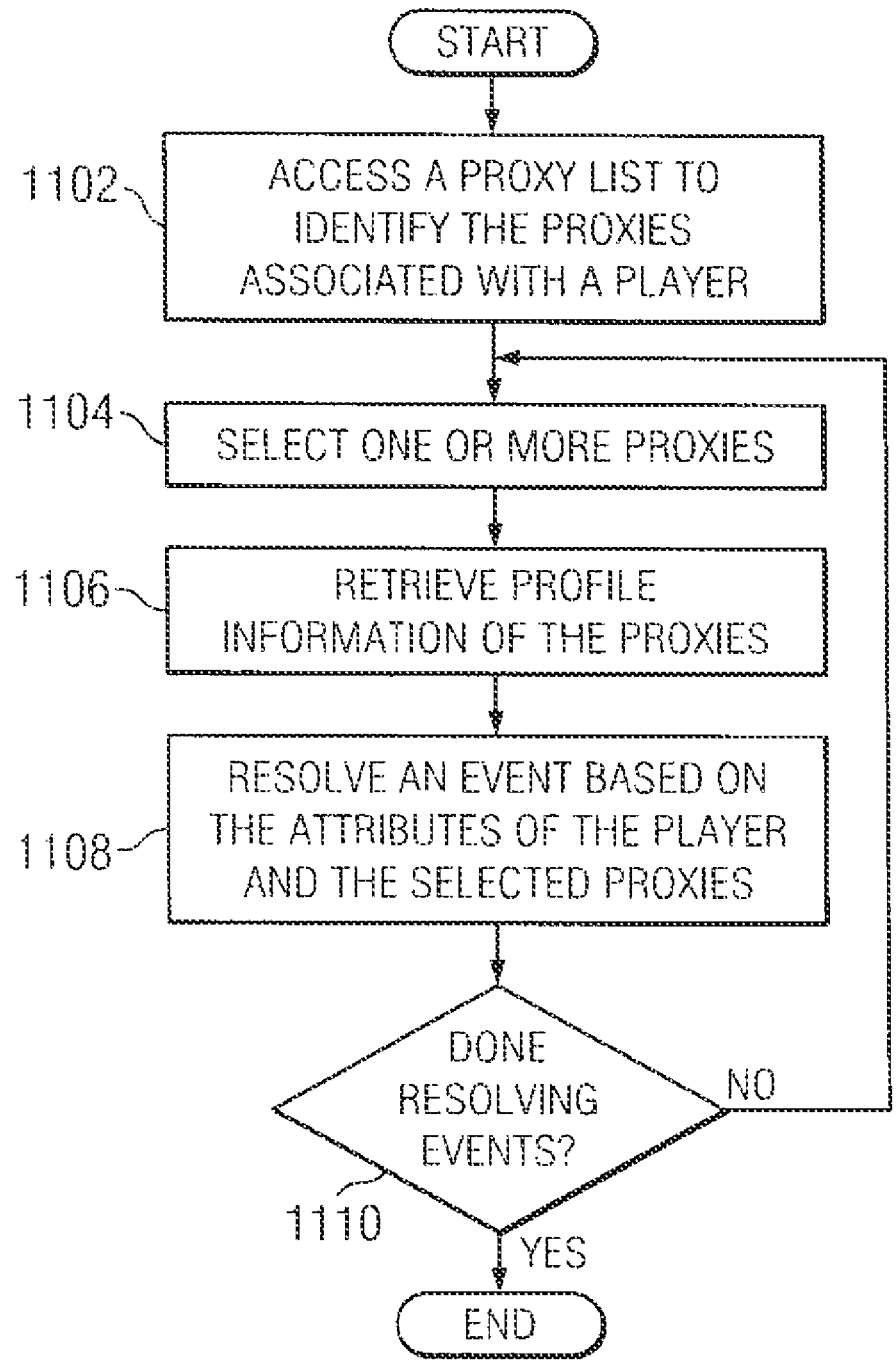
FIG. 11 shows a flowchart illustrating an example method for resolving an in-game event.

FIG. 10 depicts a schematic example of data flow in a game engine for determining, recording and updating the results of an event decision according to one embodiment of the present disclosure. FIG. 11 shows a flowchart illustrating an example method for resolving an in-game event. As discussed previously, a player (or PC) can derive benefit from associate proxies when resolving game events. The game engine can access 1102 the player's (or PC's) proxy list to identify proxies associated with the player. Proxies can then be selected 1104, either by the player or by the game engine according to a game logic. The game engine can then retrieve 1106 the profile information of the proxies and resolve 1108 a game event based, at least in part, on the attributes of the selected proxies. At this point 1110, if the event is resolved then the event can be completed; otherwise the player may have the option of selecting more proxies to aid him with the event. A game engine can consider various factors when resolving a game event 1108. For example, the event decision 1020 may be the product of a game engine receiving and considering various factors and data. For example, event decision 1020 can be the result of a game engine considering factors such as the actions of other active players 1002, Player 105's character state and actions 1004, Player 105's selected proxies 495 character states and actions 1005, random numbers 1006, opponent condition 1008, and game state 1010 (position of objects, NPCs, etc.), Once the game engine determines an event decision 1020, the game engine will produce an event result 11030. For example, where Player 1105 is attempting to scale a castle wall, the game engine can consider. Player 105's strength attribute, the attributes of Player 105's selected proxies, that the wall (i.e., opponent) is 30 feet high and sheer, that the is slippery because it is raining, and that Player 105 is being helped with other active players. Considering these factors, the game engine might determine that Player 105 has only a 15% chance of success. To make the event decision, the game engine could then generate a random number. Here, the number is greater than 0.15, meaning that Player 105 failed to scale the castle wall.

Once the event decision 1020 and the event result 1030 are determined, the game engine can produce a game update 1040 to change the state of the game and the characters of the players and NPCs involved in the game event. Game update 1040 can include a reduction of Player 105's health value, NPCs can be moved to account for Player 105 falling, and game objects can be moved according to the movements and actions of player A and other players and NPCs within the game space. For example, the bushes that Player 105 fell on after falling from the castle wall might be smashed or broken, and Player 105's health value is reduced by 30 due to the impact.

Figure 12:
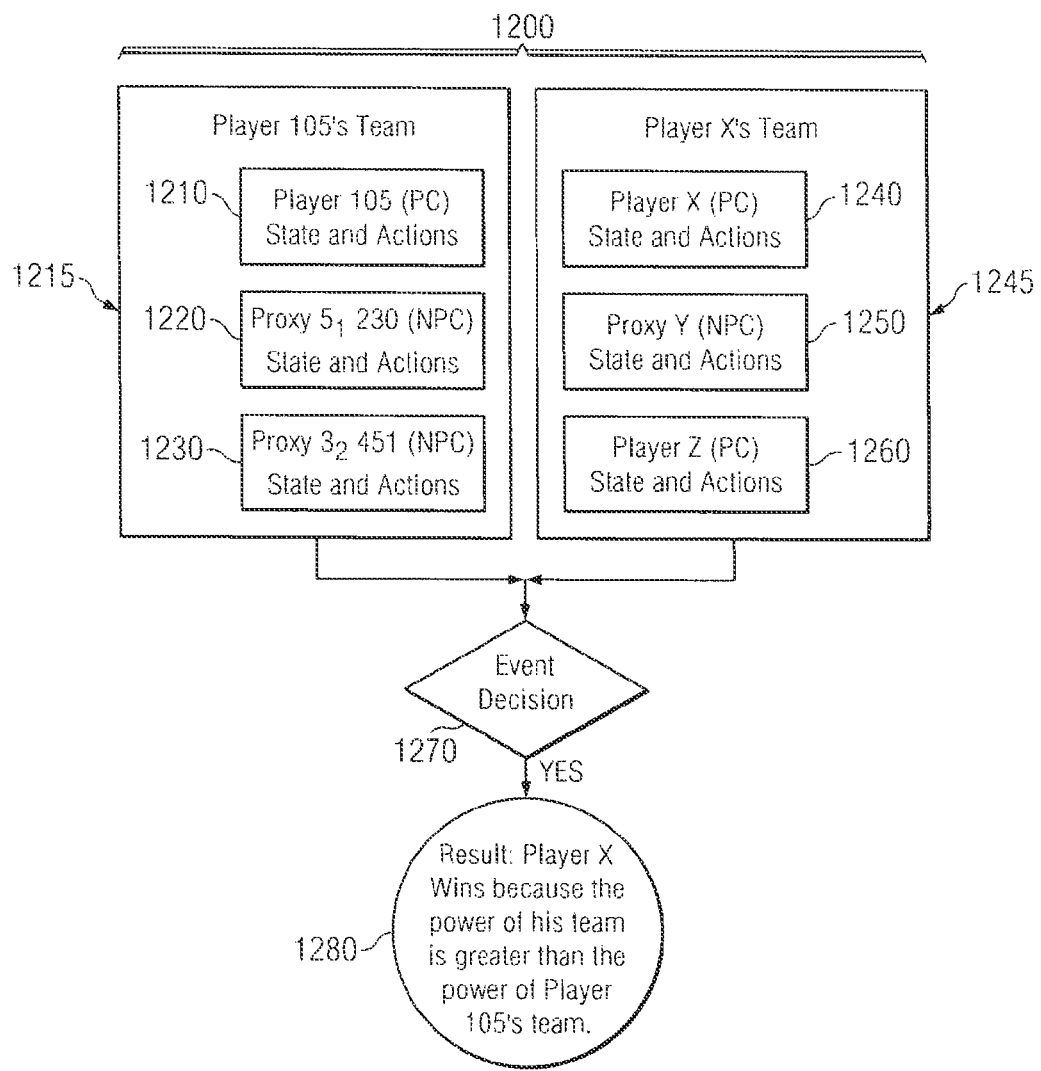
FIG. 12 depicts a schematic for determining game event decisions.

FIG. 12 depicts a schematic of data flow 1200 of various character states that a game engine can use to determine an event decision according to various embodiments of the present disclosure. As shown, a game engine can consider the character states and character actions of Player 105 1210 and any or all associated player characters, proxies and regular NPCs. In dataflow 1200, the game engine can consider character states and character actions of not only active Player 105 and active Players X and Z, but also their respective proxies. In FIG. 12, active Player 105 has formed a team with his proxies because he has no friends in real life, where his team consists of Proxy $5_1$ 230 and Proxy $3_2$ 451. Player X has also formed a team with Proxy Y and his friend, active Player Z. The game engine can consider all of the character states and character actions of all the active players and proxy players to determine the event decision 1270. In the example shown in FIG. 12, the game engine considers Player 105's state and attributes 1210, Proxy $5_1$ 230's state and attributes 1220, Proxy $3_2$ 451's state and actions 1230, Player X's state and actions 1240, Proxy Y's state and actions 1250, and Player Z's state and actions 1260 to make event decision 1270. Here, the event result 1280 is that player X wins because Player 105's team 1215 is smaller in some relevant attribute (e.g., power) than the Player X's team 1245.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the processes described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method comprising:
    accessing social network information associated with a player of an online multiplayer game, the player controlling a first player character in the online multiplayer game, the first player character having associated attributes;
    accessing profile information associated with a friend of the player, the friend of the player controlling a second player character in the online multiplayer game;
    creating, using one or more processors, a proxy based on the second player character, the proxy having a plurality of proxy attributes based on the profile information associated with the friend of the player;
    determining a game event outcome associated with the first player character based on the first player character attributes and based on at least one proxy attribute; and
    distributing results of the game event outcome to the first player character and to the second player character based on the proxy.

2. The computer-implemented method of claim 1, wherein the results of the game event outcome include an in-game benefit.

3. The computer-implemented method of claim 2, wherein the in-game benefit includes virtual currency for use in the online multiplayer game.

4. The computer-implemented method of claim 1, wherein the results of the game event outcome include an in-game detriment.

5. The computer-implemented method of claim 4, wherein the in-game detriment includes injury to the first or second player character.

6. The computer-implemented method of claim 4, wherein the in-game detriment includes loss of an in-game asset.

7. The computer-implemented method of claim 4, wherein the in-game detriment includes damage to an in-game asset.

8. The computer-implemented method of claim 1, wherein distributing the results of the game event outcome includes allocating a greater portion of the results of the game event outcome to the first player character.

9. The computer-implemented method of claim 1, wherein distributing the results of the game event outcome includes allocating a greater portion of the results of the game event outcome to the second player character.

10. The computer-implemented method of claim 1, wherein distributing the results of the game event outcome includes allocating the results of the game event outcome equally between the first player character and the second player character.

11. The computer-implemented method of claim 1, wherein distributing the results of the game event outcome includes allocating the results of the game event outcome between the first player character and the second player character based on a degree of separation between the player and the friend.

12. The computer-implemented method of claim 11, wherein distributing the results of the game event outcome includes allocating a 1/(N+1) portion of the results of the game event outcome to the proxy, wherein (N) equals the degree of separation between the player and the friend.

13. The computer-implemented method of claim 11, wherein distributing the results of the game event outcome includes:
    allocating a 1/(N+1) portion of the in-game benefit to the first player character, wherein (N) equals the degree of separation between the player and the friend; and
    allocating the remaining portion of the in-game benefit to the second player character.

14. The computer-implemented method of claim 1, wherein the friend of the player is not actively playing the online multiplayer game when determining the game event outcome.

15. An apparatus comprising:
    an interface to communicate with a player of an online multiplayer game;
    a memory to store data associated with the online multiplayer games; and
    one or more processors coupled to the interface and the memory, the one or more processors configured to:
        access social network information associated with the player of the online multiplayer game, the player controlling a first player character in the online multiplayer game, the first player character having associated attributes;
        access profile information associated with a friend of the player, the friend of the player controlling a second player character in the online multiplayer game;
        create a proxy based on the second player character, the proxy having a plurality of proxy attributes based on the profile information associated with the friend of the player;
        determine a game event outcome associated with the first player character based on the first player character attributes and based on at least one proxy attribute; and distribute results of the game event outcome to the first player character and to the second player character based on the proxy.

16. The apparatus of claim 15, wherein the results of the game event outcome are distributed to the first player character and the second player character based on at least one proxy attribute.

17. The apparatus of claim 15, wherein the friend is separated from the player by N degrees, and the results of the game event outcome are distributed by:
   allocating a 1/(N+1) portion of the game event outcome to the first player character; and
   allocating the remaining portion of the game event outcome to the second player character.

18. The apparatus of claim 15, wherein the results of the game event outcome include an in-game benefit.

19. The apparatus of claim 15, wherein the results of the game event outcome include an in-game detriment.

20. A non-transitory machine-readable storage medium comprising instructions that, when executed by one or more processors of a machine, cause the machine to perform operations comprising:

accessing social network information associated with a player of an online multiplayer game, the player controlling a first player character in the online multiplayer game, the first player character having associated attributes;

accessing profile information associated with a friend of the player, the friend of the player controlling a second player character in the online multiplayer game;

creating a proxy based on the second player character, the proxy having a plurality of proxy attributes based on the profile information associated with the friend of the player;

determining a game event outcome associated with the first player character based on the first player character attributes and based on at least one proxy attribute; and distributing results of the game event outcome to the first player character and to the second player character based on the proxy.

* * * * *